United States Patent [19]

Knemeyer

[11] 3,730,461

[45] May 1, 1973

[54] STABILITY AUGMENTATION SYSTEM FOR LIGHT AIRCRAFT PROVIDING PILOT ASSIST AND TURN

[76] Inventor: Siegfried Knemeyer, 1410 Meadow Lane, P.O. Box 123, Yellow Springs, Ohio 45387

[22] Filed: May 5, 1971

[21] Appl. No.: 140,403

[52] U.S. Cl............244/77 E, 244/77 SE, 244/77 V, 318/585
[51] Int. Cl. ........................B64c 13/18, B64c 13/44
[58] Field of Search ................244/76 A, 77 R, 77 D, 244/77 E, 77 F, 77 V, 77 SE, 79, 83 R, 83 D, 83 E, 78; 318/489, 566, 585

[56] References Cited

UNITED STATES PATENTS

| 3,584,814 | 6/1971  | Murphy..........................244/77 D |
| 3,521,839 | 7/1970  | Diani............................244/77 SE |
| 3,082,978 | 3/1963  | Smith et al.....................244/77 SE |
| 3,070,332 | 12/1962 | Hess, Jr.........................244/77 D |
| 3,128,968 | 4/1964  | Kaufman et al.................244/77 SE |
| 3,171,615 | 3/1965  | Patterson.......................244/77 SE |

FOREIGN PATENTS OR APPLICATIONS 790,272  2/1958  Great Britain......................244/77 E

*Primary Examiner*—Duane A. Reger
*Assistant Examiner*—Stephen G. Kunin
*Attorney*—Harry A. Herbert, Jr. and James S. Shannon

[57] ABSTRACT

A small aircraft with a conventional stability augmentation system for automatically maintaining a wings level constant heading attitude is provided with a switch on the control wheel which is spring biased to a central neutral position and which is actuated by the pilot to the right or left of neutral and held in the actuated position to make a right or left turn. When actuated, the switch introduces an offset signal into the stability augmentation system causing the system to produce and stabilize on a turn rate determined by the magnitude of the offset signal. The actuated switch also sets up an additional signal of opposite sense to the offset signal which is substituted for the offset signal whenever the turn rate exceeds a preset maximum, as may occur if the pilot for any reason increases the turn rate above the stabilized rate by applying sufficient force to the wheel to overpower the stability augmentation system. The opposing signal causes the stability augmentation system to warn the pilot of the excessive rate by exerting a powerful backward force on the ailerons, and on the control wheel in opposition to the pilot's force, tending to reduce the bank angle and thereby the turn rate below the preset maximum. When the switch is released to its neutral position the stability augmentation system returns the aircraft to a wings level attitude.

6 Claims, 3 Drawing Figures

STABILITY AUGMENTATION SYSTEM FOR LIGHT AIRCRAFT PROVIDING PILOT ASSIST AND TURN

There is reserved to the Government of the United States a nonexclusive, irrevocable, royalty-free license in the invention described herein with power to grant licenses for all governmental purposes.

BACKGROUND OF THE INVENTION

The invention relates to aircraft flight control systems, particularly control systems for small aircraft.

Small aircraft are frequently flown by pilots that are not proficient in flying by instruments. Such pilots may at times unavoidably encounter instrument or IFR flight conditions and become disoriented due to loss of the visual ground reference. When disoriented the pilot may unknowingly place the aircraft in dangerous flight attitudes and dynamics, such as excessive bank angles and turn rates, which may cause the aircraft to crash. Small aircraft are often equipped with relatively simple stability augmentation systems which operate to automatically hold the aircraft in a wings level attitude. Such systems however increase the difficulty in executing intentional turns since the pilot must exert sufficient force on the control wheel to overpower the stability augmentation system. To overcome this difficulty such systems usually provide an ON-OFF switch on the control wheel so that the system may be tuned OFF when executing intentional turns. While stability augmentation systems of this type afford some protection under IFR conditions when ON, the disoriented pilot in attempting to do what his senses erroneously tell him is the right thing may overpower the system and force the aircraft into a dangerous attitude from which the system may not be able to recover.

SUMMARY OF THE INVENTION

It is the purpose of the invention to provide an improved stability augmentation system for small aircraft which may be left ON at all times, which assists rather than opposes the pilot in executing intentional turns, which stabilizes the aircraft at a preselected safe turn rate in the same manner that the aircraft is normally stabilized in a wings level attitude, and which warns the pilot against excessive turn rates by strongly resisting any attempt to increase the turn rate above a preselected maximum value through overpowering the stability augmentation system at the control wheel.

The usual stability augmentation system for holding the aircraft in a wings level attitude comprises basically a rate gyro, capable of responding to both roll rates and yaw rates of the aircraft to produce an error signal containing rate magnitude and direction information, and a servomechanism coupled to the ailerons and receiving the error signal as an input for actuating the ailerons in response to the error signal in such manner as to reduce the error signal to zero. In accordance with the invention, a switch is provided on the control wheel of the aircraft which is spring loaded to a central neutral position and which the pilot actuates to the right or left and holds in the actuated position to execute a right or left turn. The force required to actuate the control surfaces is supplied by the stability augmentation system which also acts during the turn to stabilize the aircraft at a preselected turn rate. Upon release of the switch to its neutral position, the stability augmentation system returns the aircraft to a wings level attitude in the usual manner. This is accomplished as follows:

When actuated, the switch algebraically adds to the gyro error signal at the input to the servomechanism a signal which is of the same character as the gyro error signal, which is preset in magnitude to a desired turn rate, and which has directional information corresponding to that of the error signal that would be produced by the gyro if the aircraft were in a turn of opposite direction to that called for by the switch. This signal in effect offsets the zero point of the stability augmentation system which, in operating to reduce the servomechanism input to zero, is obliged to place the aircraft in a turn at such rate that the gyro error signal just cancels the offset signal. The system therefore acts to stabilize the aircraft at a turn rate that depends upon the magnitude of the offset signal which can be preset into the system.

Actuation of the switch also sets up an opposing signal of the same character as the offset signal but with opposite directional information. The gyro error signal is continuously compared with a preset reference signal representing a maximum permissible rate of turn. If the pilot for any reason increases the rate of turn above the rate at which the aircraft is stabilized by applying enough force to the control wheel to overpower the stability augmentation system and this is carried to the point where the gyro error signal exceeds the reference signal, the offset signal is removed and the opposing signal substituted therefor. The opposing signal adds to the gyro error signal to produce a large input to the servomechanism which in response acts to exert a strong backward force on the control wheel against the pilot's efforts. Because of the large input signal to the servomechanism, the backward force exerted in this circumstance is much greater than the normal resistance offered by the stability augmentation system to displacement from the stabilized turn rate and experienced by the pilot before the preset maximum rate is reached. It therefore provides an unmistakable warning to the pilot that the maximum rate has been exceeded. If the pilot heeds the warning and ceases his effort at the control wheel, or, in any event, if the pilot force at the wheel is insufficient to resist the servomechanism, the servomechanism automatically drives the ailerons and the control wheel backward to the other side of neutral thus reducing the bank angle and the turn rate until the rate has fallen below the preset maximum value. By this process the pilot is prevented from unintentionally forcing dangerously high turn rates on the aircraft.

DETAILED DESCRIPTION OF THE INVENTION

Figure 1:
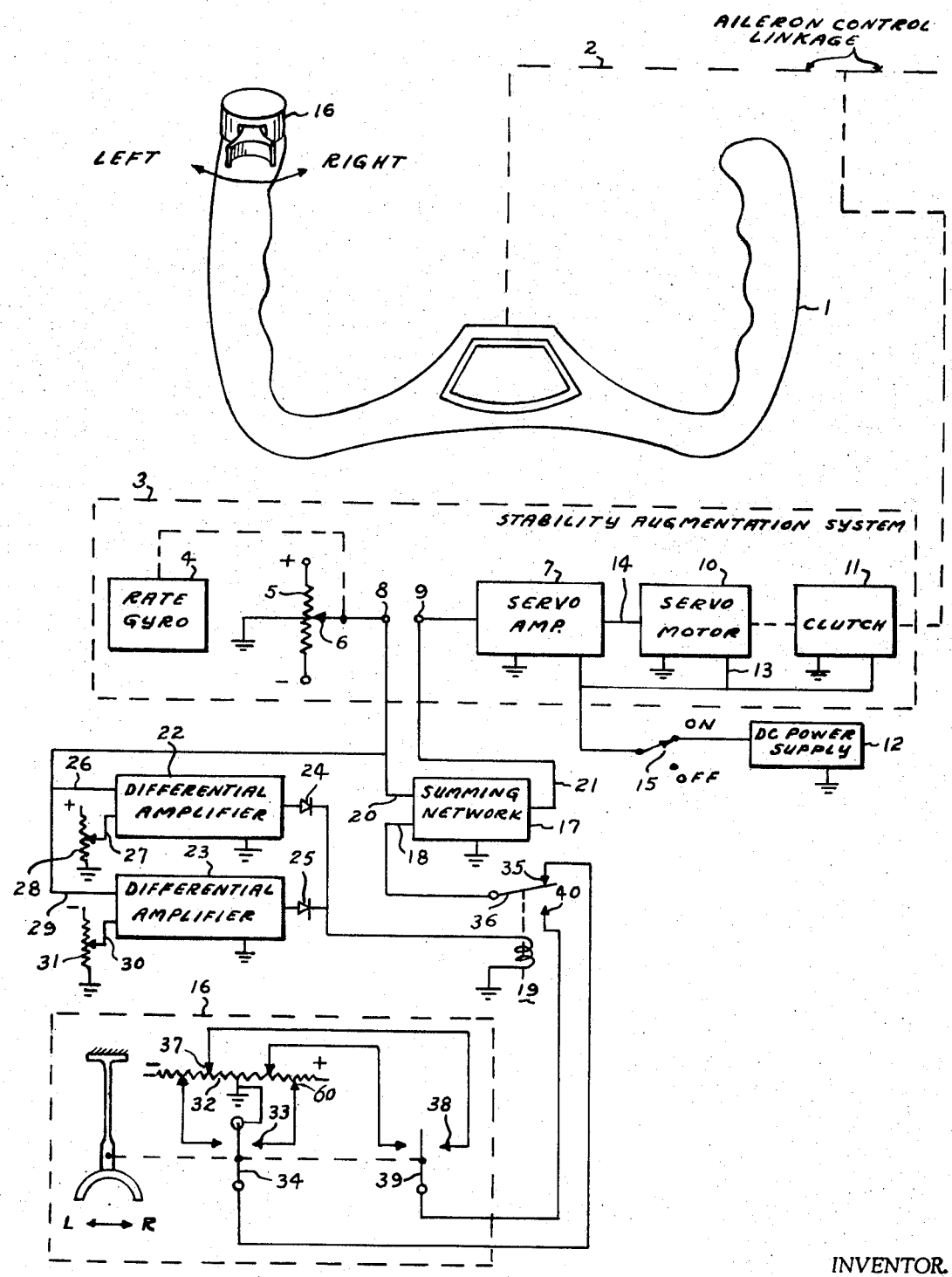
FIG. 1 shows a stability augmentation system incorporating the invention.

Referring to FIG. 1 of the drawing, 1 represents the control wheel of a typical light aircraft coupled to the ailerons through a suitable mechanical linkage 2 for controlling the aircraft about its roll axis. The rectangle 3 encloses the elements in schematic block form of a typical stability augmentation system as commonly used in such aircraft for automatically maintaining straight and level flight. Stability augmentation systems are realized in various ways, i.e., as A.C., D.C., hydraulic, or vacuum powered systems. All perform the same function and all are adaptable to the invention. For illustrative purposes, the system shown and to be described is a D.C. system.

The system comprises a rate gyro 4 having a D.C. pickoff or follow-up potentiometer 5. Standard practice is to mount the rate gyro with its axis at an angle to the roll or longitudinal axis of the aircraft and parallel to a plane normal to the pitch axis so that both roll and yaw rates are sensed. When the aircraft has no movement about either the roll or the yaw axis the contact 6 is at the center of the potentiometer 5 and the gyro output signal is zero. When the aircraft rotates about its roll or yaw axis the contact 6 is displaced from center by an amount proportional to the rotational rate or angular velocity and in a direction determined by the direction of the rotation. The invention is applied to the conventional stability augmentation system by breaking the circuit between the pickoff 5 and the input to servoamplifier 7 at 8-9, as will be explained later. In the conventional system this circuit is closed and the pickoff signal is applied directly to the amplifier. The servoamplifier provides the power required to drive servomotor 10 which is coupled through clutch 11 to the aileron control linkage 2. The servomotor 10 is shown as of the fixed field D.C. type with the field receiving a constant energization from power source 12 by way of connection 13. The D.C. output of the servoamplifier energizes the armature of motor 10 by way of connection 14, causing the motor to run in a direction determined by the polarity of the amplifier output which always corresponds to the polarity of its input from pickoff 5-6. In addition to the field of motor 10, servoamplifier 7 and clutch 11 are also energized from D.C. power source 12 through the ON-OFF switch 15 usually provided with stability augmentation systems.

When the above described system is ON it operates to oppose any rotation of the aircraft about either its roll axis or its yaw axis, thus tending to maintain the aircraft in straight and level flight. If, for example, a wind gust disturbs the straight and level flight of the aircraft, the rate gyro produces an error signal which acts through the servoamplifier 7, servomotor 10, and clutch 11 to displace the ailerons from their neutral position in the proper direction to counteract the disturbance and reduce the error signal to zero. With the system ON, intentional turns by the pilot are similarly opposed and can only be accomplished by applying sufficient force to the wheel 1 to overpower the stability augmentation system. Therefore, a switch such as 15 is usually provided to disable the system during intentional maneuvers. When switch 15 is OFF, clutch 11 is released, thus decoupling the stability augmentation system from the aileron linkage and permitting the pilot to control the ailerons with normal pressure on the control wheel 1.

Application of the invention to the above described system provides, with the system ON continuously, pilot assist and turn stabilization in intentional turns and automatic warning in the form of a strong opposing force on the control wheel when the turn rate for any cause exceeds a preset value. In accordance with the invention a switch 16 is provided on the control wheel 1 at a location convenient to the pilot. In the embodiment shown it is located at the top of the left horn of the wheel and is designed to be actuated by the left thumb. The switch is spring biased to a central neutral position. To make a right or left turn the switch is actuated to the right or left and held in the actuated position for as long as it is desired for the turn to continue. Upon release of the switch the aircraft returns to straight and level flight under control of the stability augmentation system. The electrical details of switch 16 are shown schematically within the rectangle also designated 16.

The signals produced by switch 16 are coupled into the stability augmentation system 3 through summing network 17, to one input 18 of which they are applied through the contacts of relay 19. The other input 20 is connected to terminal 8 and the output 21 is connected to terminal 9, so that the circuit continuity between these terminals is reestablished through the summing network. The summing network may be any suitable network capable of producing a signal in output circuit 21 equal to the algebraic sum of the signals in input circuits 18 and 20. The coil of relay 19 receives its energization from either differential amplifier 22 or differential amplifier 23 to the outputs of which it is connected through isolating diodes 24 and 25. Amplifiers 22 and 23 are alike except for the polarity of their inputs. Amplifier 22 is designed to operate with positive input signals. Thus, whenever a positive input signal on input 26 exceeds a preset positive reference voltage on input 27, derived from potentiometer 28, relay 19 is actuated. Similarly, amplifier 23 is designed to operate with negative input signals and produces an output to the coil of relay 19 whenever the absolute magnitude of a negative signal on input 29 exceeds a preset negative reference voltage on input 30, derived from potentiometer 31. The output signal of the rate gyro pickoff 5, available at terminal 8, is applied to the inputs 26 and 29 of amplifiers 22 and 23 in parallel for controlling the operation of relay 19.

The operation of the complete system as described above is as follows: First it will be assumed that the construction of the rate gyro and its pickoff 5 is such that a roll or yaw rate of the aircraft to the left produces a positive error signal at terminal 8 and a roll or yaw rate to the right produces a negative error signal at this point. It follows then that a positive error signal at the input of servoamplifier 7 displaces the ailerons in the direction required to roll the aircraft to the right and thus oppose a left roll or yaw. Similarly, a negative error signal at the servoamplifier provides the proper direction of aileron displacement to roll the aircraft to the left and thus oppose a right roll or yaw. With switch 16 in its normal central position, there is no signal on input 18 of summing network 17 and the aircraft is maintained in straight and level flight by the stability augmentation system in conventional manner, the summing network in this circumstance merely serving to complete the circuit between terminals 8 and 9.

Assume now that the pilot wishes to execute a right turn. Switch 16 is actuated to the right and held in the actuated position. Positive voltage is now applied from contact 60 of potentiometer 32 through closed contacts 33-34 of switch 16 and normally closed contacts 35-36 of relay 19 to input 18 of summing network 17, and thence through this network to the input terminal 9 of the aileron servomechanism. Since the aircraft is in straight and level flight there is no rate gyro error signal at terminal 8 and therefore the voltage from switch 16 constitutes the entire input at terminal 9. The servomechanism responds to this positive signal in the same manner in which it would respond to a positive error signal from the rate gyro produced by roll and yaw rates to the left, i.e., it actuates the ailerons in the direction required to bank the aircraft to the right and thus initiates a right turn.

The right roll and yaw rates which the aircraft is now undergoing produce a negative error signal from the rate gyro which is applied through terminal 8 to input 20 of summing network 17 and to input 29 of differential amplifier 23. The negative error signal reduces the positive voltage at terminal 9, however as long as this voltage is positive the servomechanism continues to run in the initial direction and the bank angle, the rate of turn, and the error signal continue to increase. When the increasing error signal has reduced the voltage at point 9 to zero the servomechanism stops. However, since the ailerons are still displaced from their neutral position, the bank angle and rate of turn continue to increase causing the error signal to exceed the positive voltage at summing network input 18 and a negative voltage to appear at terminal 9. This starts the servomechanism running in the reverse direction, driving the ailerons to the other side of their neutral position and as a result reducing the bank angle and turn rate until the negative error signal has become less than the positive voltage at summing input 18. This produces a network voltage at terminal 9 causing the servomechanism to again reverse its direction of rotation. By this process the stability augmentation system stabilizes the turn rate of the aircraft at the value for which the gyro error signal equals the voltage at contact 60 of switch 16 and the net voltage at point 9 is zero. The turn rate at which the aircraft stabilizes is therefore determined by the voltage at contact 60, which may be adjusted to provide any desired safe rate, for example, 2°/second. The voltage introduced into the stability augmentation system by switch 16 in effect offsets the stability point of the system so that the system stabilizes the aircraft at a certain bank angle and turn rate rather than at a wings level attitude or zero turn rate. Considered in this way, the offset voltage for wings level flight is zero, which is the voltage supplied by switch 16 in its neutral position.

Maximum turn rate limitation is provided by relay 19 under the control of differential amplifiers 22 and 23. If the pilot should increase the right turn rate above the stabilized rate by applying sufficient force to the control wheel to overpower the stability augmentation system and carry this effort to the point where the negative error signal produced by the gyro and applied to input 29 of differential amplifier 23 exceeds the negative reference voltage at input 30, relay 19 is actuated and the negative voltage present at terminal 37 in switch 16 is applied through contacts 38-39 of the switch and contacts 40-36 of relay 19 to the input 18 of the summing network. At the same time the offset voltage from contact 60 of the switch is removed from summing network input 18. The negative voltage at contact 37 adds to the negative error signal of the gyro in the summing network 17 to produce a large negative signal at terminal 9. The servomechanism responds to this large input signal by exerting a strong backward force on the control wheel against the pilot's efforts. Because of the large input signal to the servomechanism, the backward force exerted in this case is much greater than the normal resistance offered by the stability augmentation system to displacement from the stabilized turn rate and experienced by the pilot before the preset maximum rate is reached. It therefore provides an unmistakable warning to the pilot that the maximum rate has been exceeded. If the pilot heeds the warning and ceases his effort at the control wheel, or reduces his effort to a force insufficient to resist the servomechanism, the servomechanism automatically drives the ailerons and the control wheel backward to the other side of their neutral position thus reducing the turn rate until the negative gyro error signal has been reduced in magnitude to a value smaller than the negative reference voltage on input 30 of the differential amplifier. When this occurs relay 19 is deenergized removing the negative voltage from the summing network input 18 and restoring the positive offset voltage derived from contact 60 of potentiometer 32. If the pilot has ceased his efforts to overpower the stability augmentation system, the system continues to reduce the turn rate until the gyro error signal has become equal to the offset voltage and again stabilizes the aircraft at the turn rate corresponding to this voltage. The system therefore prevents the pilot from unintentionally exceeding the maximum safe turn rate preset at potentiometer 31.

Left turns may be executed by actuating switch 16 to the left and holding it in the left position for the desired duration of the turn. The operation is the same as for a right turn except that differential amplifier 22 and left maximum rate presetting potentiometer 28 are operative in place of differential amplifier 23 and potentiometer 31. The right or left turn rate at which limitation occurs may be preset to any value at potentiometers 31 and 28. Usually this is the maximum safe turn rate for the particular aircraft, or a value near to this.

Figure 2:
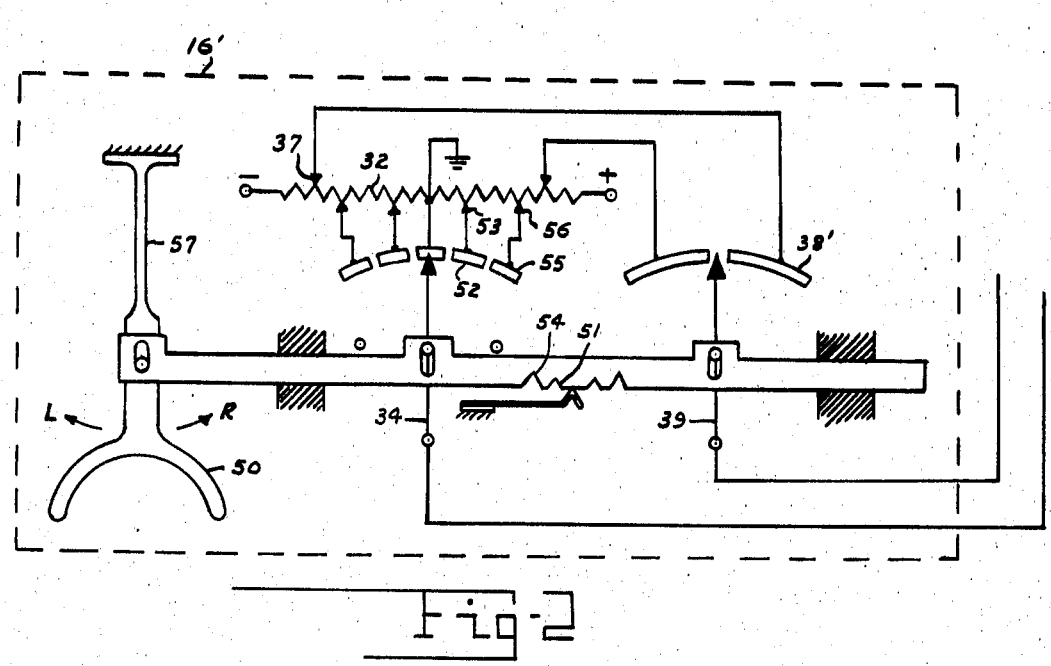
FIG. 2 illustrates a modification of the control wheel switch used in FIG. 1 providing for two selectable stabilized turn rates.

FIG. 2 shows a modification of the system of FIG. 1 in which a somewhat more complex control wheel switch 16' is employed to provide, in addition to pilot assist and maximum turn rate limitation, turn rate stabilization at a plurality of preselected lower values (in this case two). To execute a turn at the lower of the two values the pilot moves the switch lever 50 to the right until the first detent 51 is felt, and holds the switch at this position. This places contact 34 on contact 52 and applies the positive voltage at adjustable contact 53 through normally closed contacts 35-36 of relay 19 to the input 18 of summing network 17, and thence to the input of the servoamplifier at point 9. The positive voltage at point 9 initiates a right turn of the aircraft and the stability augmentation system stabilizes the turn rate at a value determined by the voltage at contact 53 in the same manner as already explained for FIG. 1. A higher turn rate may be achieved by actuating the switch to the second detent position 54, in which case contact 34 rests on contact 55 and the turn rate is increased to and stabilized at a value determined by the voltage at contact 56. Contacts 53 and 56 may be set, for example, to low and moderate turn rates such as 1°/second and 2°/second. Any actuation of the switch from its neutral position energizes contact 39 for maximum turn rate limitation in the manner explained for FIG. 1. The turn may be ended by releasing switch actuator 50 and allowing it to return to its neutral position under the influence of spring 57. The detent is made strong enough to give a positive indication to the pilot but not enough to resist the return spring.

Figure 3:
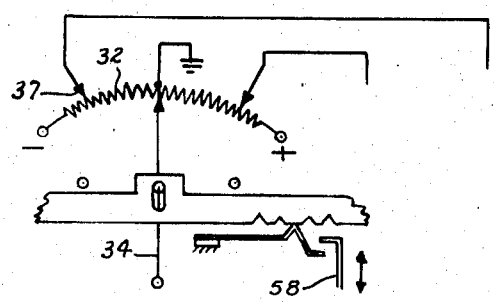
FIG. 3 is a further modification of the control wheel switch providing for a stabilized turn rate that is a continuous function of the degree of switch actuation from its neutral position.

FIG. 3 is a modification of switch 16' of FIG. 2 in which the voltage at contact 34 increases continuously as the switch is displaced from its neutral position, rather than in steps as in FIG. 2. In this case any desired stabilized turn rate, up to the maximum set at potentiometer 31, can be achieved depending upon the distance from its neutral position at which the switch is held. If desired, detents may be used in this case also to mark standard rates. The use of detents may be made selective by employing a detent spring retractor 58.

As in FIG. 1, the operation for left turns is the same as for right turns except that the switch is actuated to the left and turn rate limitation is provided by differential amplifier 22 rather than by differential amplifier 23.

Certain existing stability augmentation systems for small aircraft employ vacuum actuators for the ailerons. Vacuum is admitted to these actuators through a control valve that is mechanically coupled to the rate gyro. In applying the invention to a system of this type, the voltage at contact 36 of relay 19 is applied, through a suitable coupling network, to a torquer on the control valve for controlling its position independently of the gyro. In this case, summing network 17 and all apparatus beyond in the drawing are eliminated. In general, in applying the invention to a stability augmentation system of any type, the output of switch 16, as it appears at contact 36 of relay 19, is utilized directly or indirectly to provide an input to the servomechanism which controls the ailerons that is in addition to the input supplied by the rate gyro.

I claim:

1. In an aircraft having a manual roll axis control directly coupled to the ailerons and having a stability augmentation system comprising a rate gyro that responds to roll and yaw rates to produce an error signal having rate magnitude and rate direction information and a servomechanism coupled to said ailerons and receiving said error signal at its input for automatically maintaining said aircraft in a wings level constant heading attitude: a switch spring biased to a neutral position and actuatable by the pilot to the right or left of neutral to execute a right or left turn, said switch operating when actuated to produce an offset signal of the same character as said error signal and having the same directional information that said error signal would have if said aircraft were turning in a direction opposite to the turn direction corresponding to the direction of switch actuation, said switch also operating when actuated to produce an additional signal of the same character as said offset signal but having opposite directional information; means for algebraically adding said offset signal to said error signal at the input to said servomechanism; and means for comparing the absolute magnitude of said error signal with the absolute magnitude of a reference signal representing a predetermined maximum rate of turn and operative whenever said error signal is larger than said reference signal to substitute said additional signal for said offset signal as the signal algebraically added to said error signal at the input to said servomechanism.

2. Apparatus as claimed in claim 1 in which said switch is constructed to produce an offset signal that increases in a plurality of steps with the degree of actuation from the neutral position and to produce said additional signal for all degrees of actuation from the neutral position.

3. Apparatus as claimed in claim 2 in which the offset signal steps are marked by switch detents strong enough to be sensed by the pilot but not strong enough to interfere with the return of the switch to its neutral position when released.

4. Apparatus as claimed in claim 1 in which said switch is constructed to produce an offset signal that increases continuously with the degree of actuation from the neutral position and to produce said additional signal for all degrees of actuation from the neutral position.

5. Apparatus as claimed in claim 4 in which at least one value of said offset signal is marked by a switch detent strong enough to be sensed by the pilot but not strong enough to interfere with the return of the switch to its neutral position when released.

6. Apparatus as claimed in claim 1 in which the manual control is of the two-horn wheel type, in which the switch is mounted at the top of one of the horns, and in which the switch has an actuating lever with a U-shaped thumb receptacle to permit actuation to either side of the neutral position by the thumb of the pilot.

* * * * *